(12) United States Patent
Iwai et al.

(10) Patent No.: US 6,382,374 B1
(45) Date of Patent: May 7, 2002

(54) BRAKE SYSTEM FOR A MOTORCYCLE

(75) Inventors: Toshiyuki Iwai; Takanori Aika; Shinji Ito, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,316

(22) Filed: Nov. 19, 1999

(30) Foreign Application Priority Data

Nov. 30, 1998 (JP) ............................................. 10-340789

(51) Int. Cl.[7] .................................................. B62L 3/08
(52) U.S. Cl. .................... 188/345; 188/24.14; 303/9.64; 280/277
(58) Field of Search ............................ 188/24.14, 72.2, 188/349, 345; 303/9.64; 280/276, 277; 180/219; 293/105

(56) References Cited

U.S. PATENT DOCUMENTS

| | | | | |
|---|---|---|---|---|
| 4,625,985 A | * | 12/1986 | Nakano et al. | 280/276 |
| 4,703,839 A | * | 11/1987 | Nakano et al. | 188/346 |
| 4,775,163 A | * | 10/1988 | McGowan et al. | 280/277 |
| 5,186,274 A | * | 2/1993 | Hegman | 180/227 |
| 5,219,211 A | * | 6/1993 | Tsuchida et al. | 303/9.64 |
| 5,363,943 A | * | 11/1994 | Iwashita et al. | 188/72.5 |
| 5,564,534 A | * | 10/1996 | Toyoda et al. | 188/345 |
| 5,758,928 A | * | 6/1998 | Kobayashi et al. | 303/2 |
| 5,775,454 A | * | 7/1998 | Scherbarth et al. | 180/219 |
| 6,164,675 A | * | 12/2000 | Pickering | 280/277 |

FOREIGN PATENT DOCUMENTS

| | | |
|---|---|---|
| JP | U3120286 | 12/1991 |
| WO | WO 87/01670 | * 3/1987 |

* cited by examiner

Primary Examiner—Christopher P. Schwartz
Assistant Examiner—Bradly King
(74) Attorney, Agent, or Firm—Birch, Stewart, Kolasch & Birch, LLP

(57) ABSTRACT

A brake stem for a motorcycle in which the operation of the front and rear brakes is synchronized. A front brake caliper is attached to a bracket on the front wheel. The braking force on the caliper is transmitted to a master cylinder via the bracket, and serves to compress the master cylinder. The master cylinder includes an outlet which transmits pressurized hydraulic fluid from the master cylinder to a rear brake.

20 Claims, 10 Drawing Sheets

BRAKE SYSTEM FOR A MOTORCYCLE

BACKGROUND OF THE INVENTION

1. Technical Field

This invention relates to a brake system for a motorcycle which includes a bottom link type front wheel suspension, and rear disc brakes operated in synchronization with front disc brakes.

2. Background Art

Conventional synchronized brake systems are known in which a hydraulic rear disc brake operates in synchronization with a hydraulic front disc brake. An example of such a synchronized brake system is disclosed in Japanese Utility Model Laid-Open No. 3-120286, entitled "Synchronized Brake System." The foregoing citation will be referred to as "Citation (1)" and the reference numerals of this document are used in the following description.

Referring to FIGS. 1 and 3 of Citation (1), the motorcycle includes the combination of a telescopic front wheel suspension and a synchronized brake system, in which the front wheel is rotatably attached to the bottom of a front fork 4. The brake disc 13 of the primary brake system 11 is attached to the front wheel, and the brake caliper 12 of the primary brake system 11 is attached to the bottom of the front fork 4 using an offset shaft 14. The secondary master cylinder 41 is coupled to the brake caliper 12 as an integral part.

When the brake lever 1 is operated, the brake caliper 12 brakes the disc brake 3. In this state, the cylinder body 42 of the secondary master cylinder 41 swings in response to a braking reaction force, and generates hydraulic pressure, which enables the rear brake system 31 to brake the rear wheel.

If a telescopic front wheel suspension is applied to a large motorcycle, spring/damper units having a large stroke should be used in order to ensure a large vertical stroke for a front wheel, which inevitably enlarges the spring/damper units. Conversely, when small stroke spring/damper units are utilized, a bottom link type suspension is relatively advantageous since the stroke of the spring/damper units can be made smaller using a link, with respect to the vertical stroke of the front wheel.

For example, Japanese Utility Model Laid-Open No. 6040396, entitled "Front Wheel Suspension for Motorcycle", discloses a motorcycle including a bottom link type front wheel suspension. This citation will be referred to as "Citation (2)". As shown in FIG. 1 of Citation (2), the upper parts of the front and rear arms 12, 13 are coupled to the lower part of the front fork 7, the rear part of the front wheel support 16 is coupled to the arms 12 and 13, the front wheel axle 20 is attached to the front part of the front wheel support 16, and the front wheel 11 is attached on the front wheel axle 20.

If the synchronized brake system disclosed in Citation (1) is incorporated into the motorcyle of Citation (2), it is impossible to attach the caliper to the front fork 7 of Citation (2). This is because the front wheel 1 swings vertically with respect to the front fork 7.

In order to overcome this problem, it is conceivable to attach the caliper and the secondary master cylinder to the front wheel support 16. However, since the bottom link type front wheel suspension is employed, the front wheel support 16 moves vertically with respect to the front fork 7, followed by the vertical movement of the caliper and the secondary master cylinder. As a result, the secondary master cylinder is caused to operate in addition to the braking operation. This additional operation of the secondary master cylinder is not preferable. Therefore, it is impossible to easily incorporate the technique of Citation (1) into Citation (2).

For the purpose of overcoming the foregoing shortcomings, a special transmitting mechanism may be provided, in which a secondary master cylinder is attached to the front fork 7, and a caliper is attached to the front wheel supports 16, so that braking reaction force is transmitted to the secondary master cylinder via the caliper. However, this arrangement complicates the bottom link type front wheel suspension and the synchronized brake system, and leaves much room for improvement.

This invention in part is therefore intended to provide a technique which assures appropriate and smooth synchronized operation of a simple synchronized brake system in a motorcycle having a bottom link type front wheel suspension.

SUMMARY OF THE INVENTION

The present invention accomplishes the foregoing object and other advantages not contemplated by conventional art.

An embodiment of the invention provides a brake system for a motorcycle including a bottom link type front wheel suspension, hydraulic front disc brakes, and a hydraulic rear disc brake. The brake system includes brackets which are attached to a front wheel axle and orthogonal thereto. Calipers for the hydraulic front disc brakes are attached to the brackets, and tips of the brackets are coupled to a front fork via torque transmitting links. A master cylinder is attached on the middle of one of the torque transmitting links, and generates hydraulic braking pressure for operating the hydraulic front disc brakes. The master cylinder is activated in response to compressive force applied to the torque transmitting links, and brakes a rear wheel.

When the hydraulic front disc brakes brake the front wheel, the braking reaction force of the front wheel acts as compressive force (axial tension) on the torque transmitting links from the calipers, and acts on the master cylinder provided on one of the torque transmitting links. Therefore, the master cylinder generates braking hydraulic pressure, which acts on the calipers of the hydraulic rear disc brake, thereby braking the rear wheel. No special transmitting mechanism is required in order to transmit the braking reaction force to the master cylinder from the calipers. Further, it is not necessary to extensively modify the bottom link type front wheel suspension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will be described with reference to the embodiments shown in the accompanying drawings. The front, rear, left, right, upper and lower directions refer to the directions viewed by a rider on the motorcycle.

Figure 1:
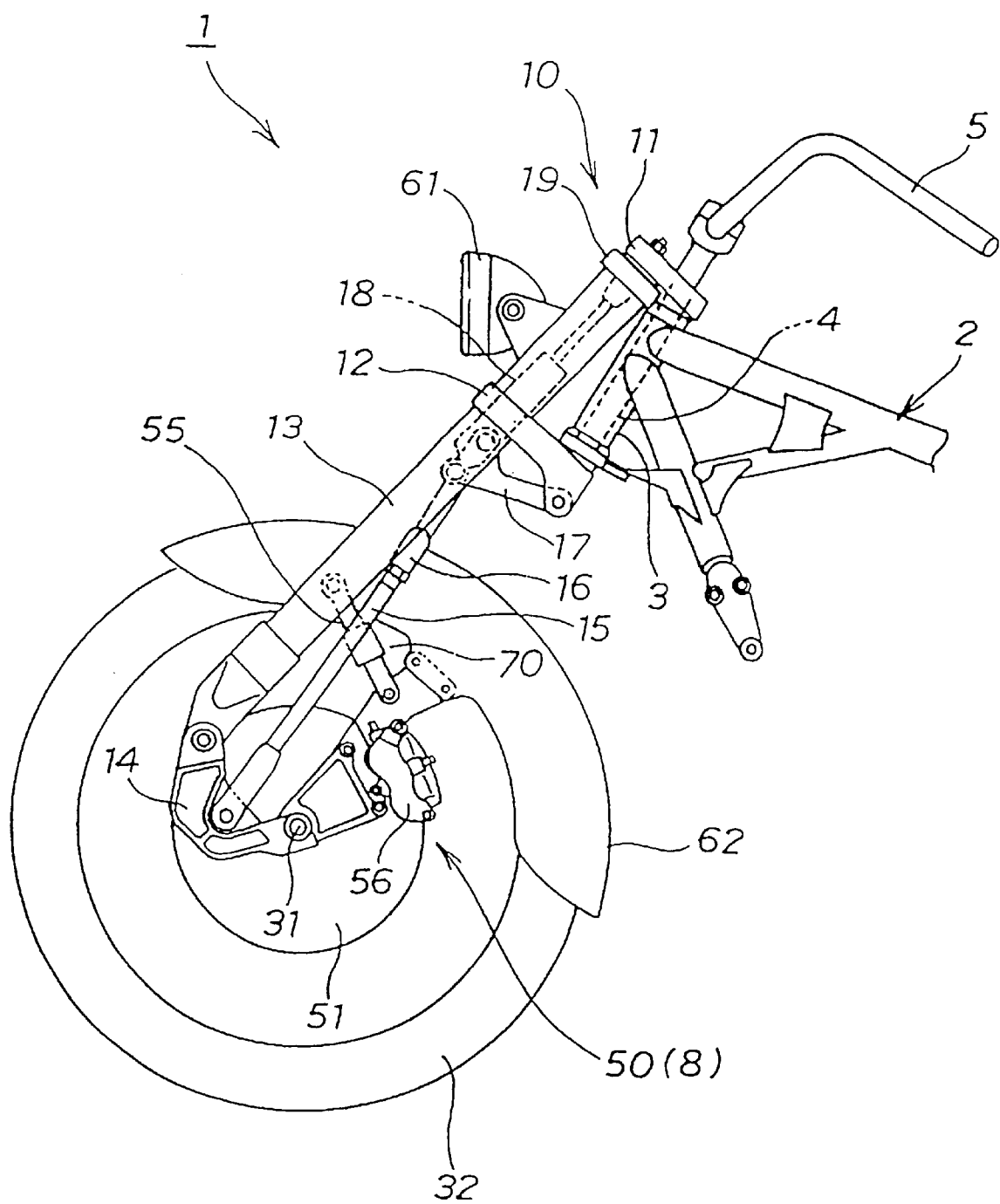
FIG. 1 is a side view of the front part of a motorcycle according to the present invention.

FIG. 1 is a side view of a front part of a motorcycle 1 according to the present invention. The motorcycle 1 includes: a longitudinal steering stem 4 attached to a head pipe 3 of a body frame 2 and being rotatable to the right and left; a top bridge 11 attached to the top of the steering stem 4; a steering handle bar 5 attached to the top bridge 11; and a bottom link type front wheel suspension 10 coupled to the steering stem 4. The motorcycle 1 is also provided with a synchronized brake system 8, in which a hydraulic rear disc brake operates in synchronization with the hydraulic front disc brakes 50.

Each hydraulic front disc brake 50 includes a front brake disc 51 attached to a side of a front wheel 32, and a front caliper 56 for operating the front brake disc 51. Reference numeral 61 denotes a headlamp.

Figure 2:
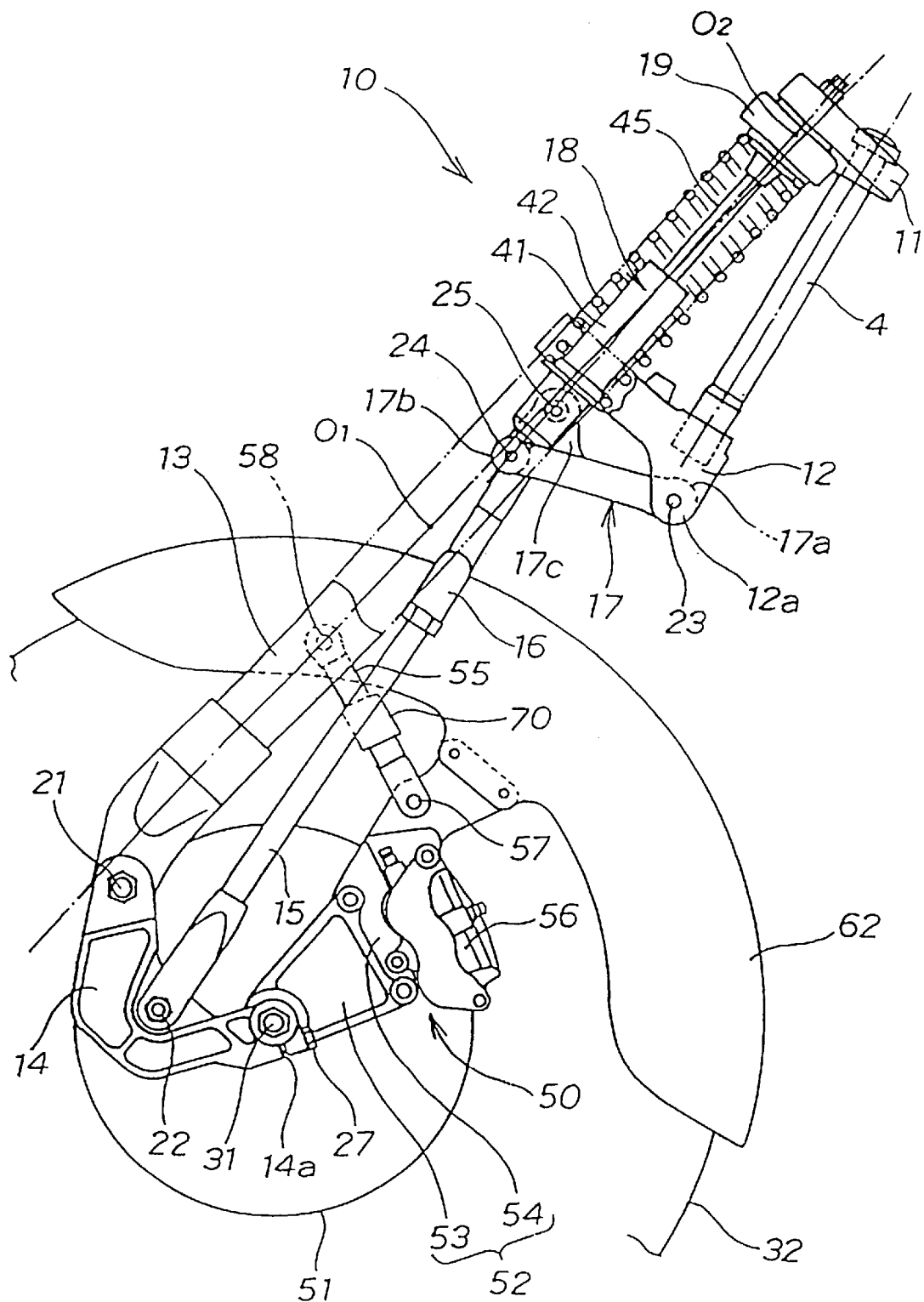
FIG. 2 is a side view of a front wheel suspension and hydraulic front disc brakes according to the present invention.

FIG. 2 is a side view of a front wheel suspension 10 and hydraulic front disc brakes 50 according to the present invention. The front wheel suspension 10 is a trailing arm type suspension which includes: the top and bottom bridges 11 and 12 attached to the top and bottom of the steering stem 4, respectively; a front fork 13 with its upper part connected to the top and bottom bridges 11 and 12; front wheel support arms 14 coupled to the lower end of the front fork 13 extending forward and downward and being swingable at a front end thereof, rods 15 having lower ends swingably coupled to the center of the front wheel support arms 14 extending rearward and downward; an arm 17 extending forward from the bottom bridge 12 in order to connect to the upper ends of the rods 15 via a rod hanger 16, and being swingable longitudinally; spring/damper units 18 coupled to the arm 17 at the lower ends thereof; and an upper bracket 19 attached at the upper part of the front fork 13 in order to connect to the upper ends of the spring/damper units 18. Reference numerals 21 to 25 denote coupling pins.

The front wheel suspension 10 is of the trailing arm type, so that a front wheel axle 31 is disposed between the rear ends of the front wheel support arms 14, and the front wheel 32 is rotatably coupled to the front wheel axle 31. In order to attach the axle 31 in a tense state, the front wheel support arms 14 adopt a "slit bolting method", in which a slit 14a is formed on each front wheel support arm 14 and extends to an opening where the axle 31 is fitted, and the slit 14a is fastened using a bolt 27. The left front wheel support arm 14 is attached by the slit bolting method. The same is applicable to the right front wheel support arm 14 (not shown).

The front wheel suspension 10 features that: when viewed from a side, the front fork 13 is positioned in front of the steering stem 4, and is inclined with an angle that is smaller than that of the steering stem 4, and the center $O_2$ of the spring/damper units 18 is substantially in agreement with the center $O_1$ of the front fork 13.

Each spring/damper unit 18 includes a hydraulic damper 41 and a suspension spring 42 wound around the damper 41. An outer diameter of the suspension spring 42, i.e., a maximum diameter of the spring/damper unit 18, is substantially equal to the diameter of the front fork 13.

The axle 31 is provided with brackets 52 which are orthogonal to the axle and are vertically swingable. Each bracket 52 has a first bracket 53 and a second bracket 54 attached to one end of the first bracket 53. The second brackets 54 have their ends coupled to the longitudinal center of the front fork 13 via the torque transmitting links 55, and are also used to attach front calipers 56 and a front mudguard 62.

The torque transmitting links 55 are coupled using coupling pins 57 and 58, swing vertically, and function to stop the rotation of the brackets 52. The braking reaction force acting on the front calipers 56 is transmitted to the front fork 13 via the second brackets 54 and the torque transmitting links 55.

Figure 3:
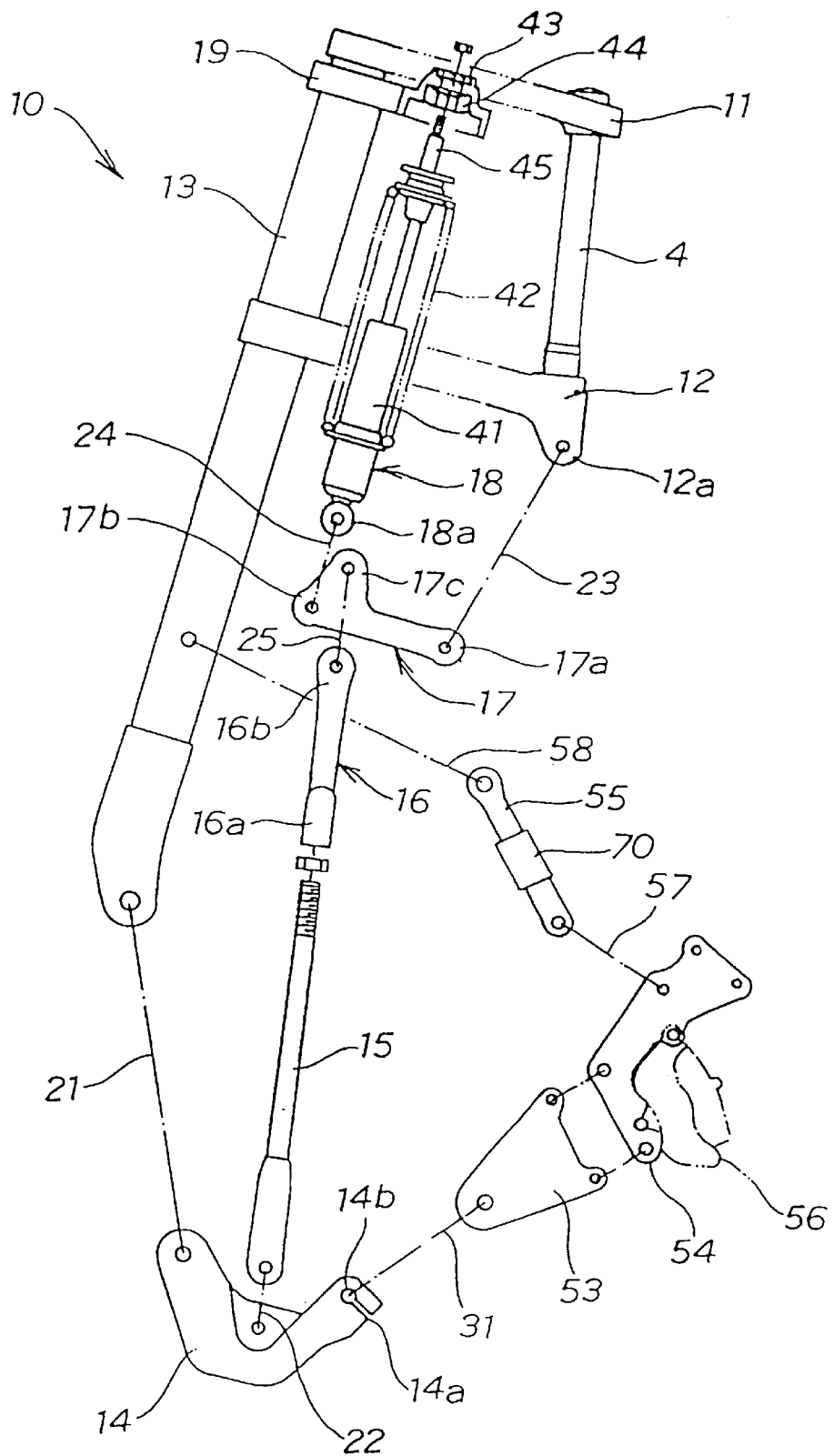
FIG. 3 is an exploded side view of a front wheel suspension according to the present invention.

FIG. 3 is an exploded side view of the front wheel suspension 10. FIG. 3 shows a coupler 12a provided at the lower end of the bottom bridge 12. A rear part 17a of the arm 17 is coupled to the coupler 12a so as to be vertically swingable (the arm 17 is also called the "crank"), and the bottoms 18a of the spring/damper units 18 are coupled to a front part 17b of the arm 17, and are vertically swingable. The upper end 16b of the rod hanger 16 is coupled to the center part 17c of the arm 17 and is vertically swingable. The center part 17c is located near the center of the arm 17, and above the front part 17b.

FIG. 3 also shows that the slit 14a of each front wheel support arm 14 extends to the opening 14b in which the front wheel axle 31 is fitted.

Figure 4:
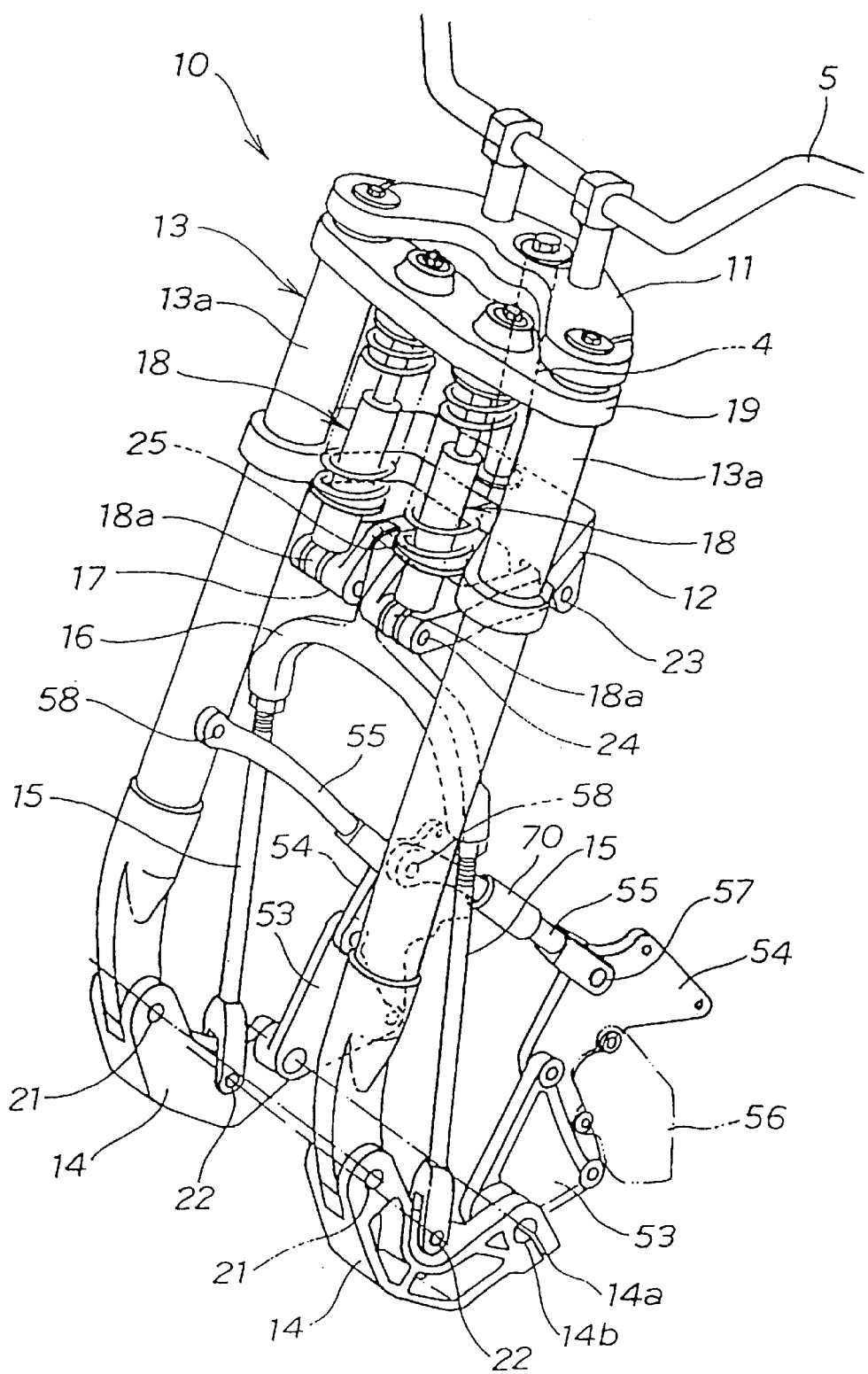
FIG. 4 is a perspective view of a front wheel suspension and hydraulic front disc brakes according to the present invention.

FIG. 4 is a perspective view of the front wheel suspension 10 and the hydraulic front disc brake 50, and shows that right and left front fork pipes 13a of the front fork 13, right and left front wheel supports 14, right and left rods 15, and right and left spring/damper units 18 constitute the front wheel suspension 10. The top and bottom bridges 11 and 12 are substantially in the shape of C, so as not to interfere with the right and left spring/damper units 18. Further, two sets each (i.e. right and left) of the first and second brackets 53 and 54, and right and left torque transmitting links 55, and right and left front calipers 56 are provided.

The right and left torque transmitting links 55 are slightly curved toward the center of the motorcycle body so that they do not interfere with the rods 15. A master cylinder 70 is attached on one of the torque transmitting links 55, which can, for example, be the left link. Alternatively, the torque transmitting links 55 may be straight if they do not interfere with the rods 15. The secondary front master cylinder 70 will be described in detail later.

Figure 5:
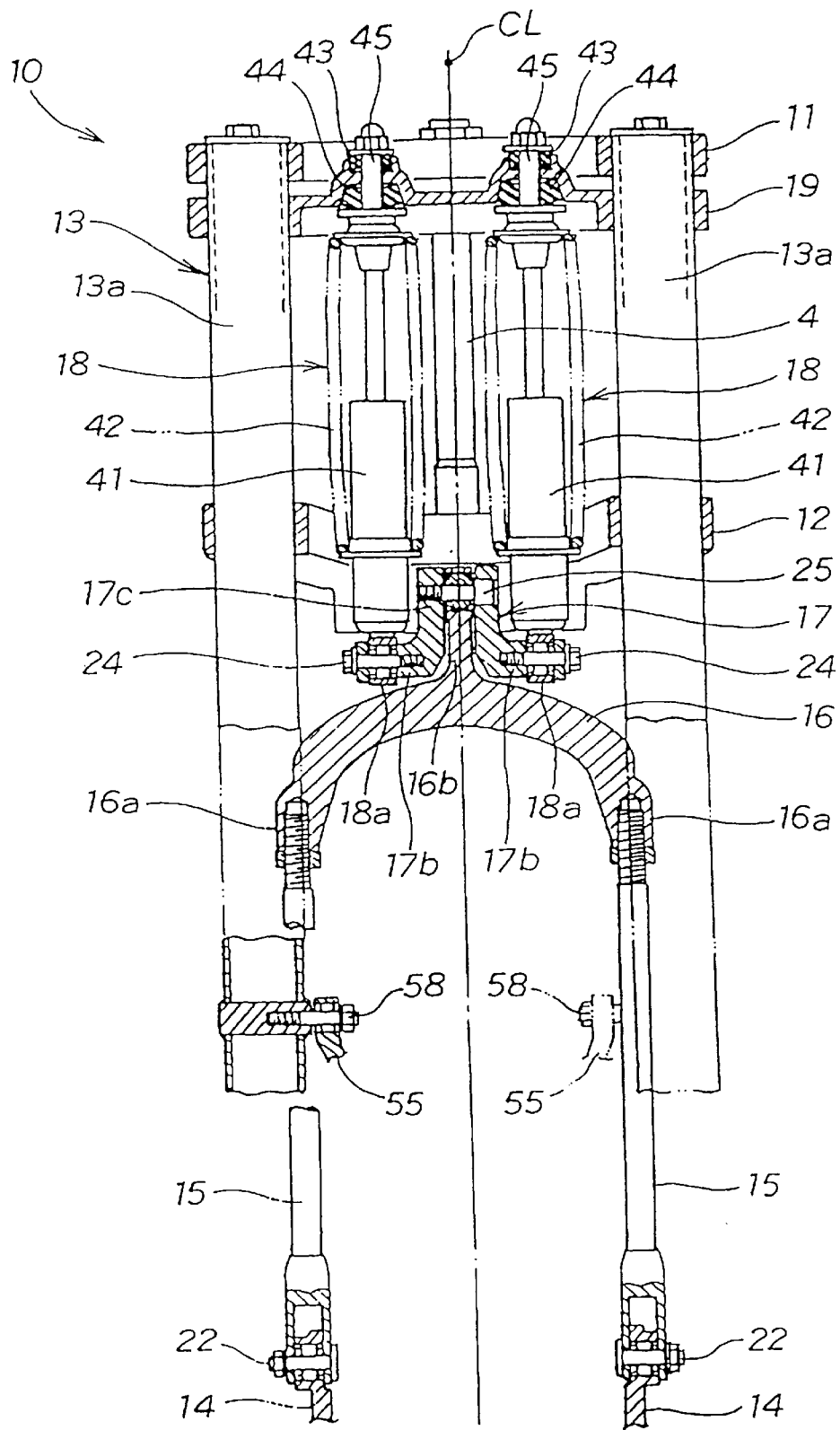
FIG. 5 is a front sectional view of a front wheel suspension according to the present invention.

FIG. 5 is a front sectional view of the front wheel suspension 10. As shown in FIG. 5, the suspension 10 may be symmetrical with respect to the center CL of the motorcycle body. The rod hanger 16 includes right and left rod receptacles 16*a* into which the upper ends of the rods 15 are screwed, and an upper part 16*b* coupled to the arm 17, and is substantially in the shape of an inverted Y. The rod hanger 16 may have the rod receptacles 16*a* and upper parts 16*b* included as integral parts.

The lower ends 18*a* of the right and left spring/damper units 18 are coupled to the arm 17. The upper bracket 19 extends across the front fork pipes 13*a* under the top bridge 11. Two damper rods 45, i.e., the tops of the spring/damper units 18, are suspended from the upper bracket 19 via a pair each of upper and lower cushions 43 and 45 made of rubber or the like. The damper rods can swing in all directions, so that the spring/damper units 18 are coupled to the top bridge 11. In other words, the spring/damper units 18 are coupled to the top bridge 11 via the upper bracket 19. Alternatively, the spring/damper units 18 may be directly coupled to the top bridge 11.

Figure 6:
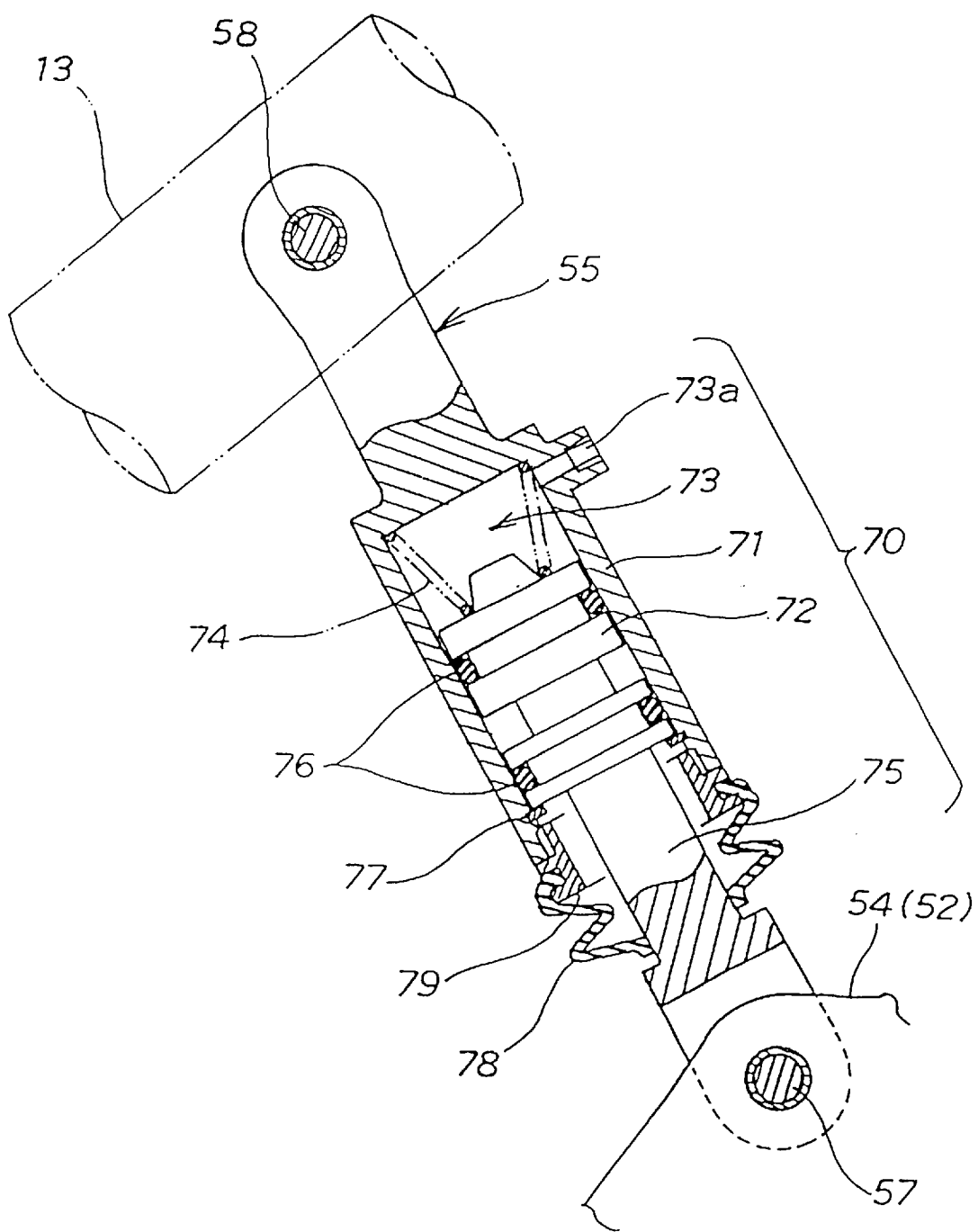
FIG. 6 is a side sectional view of a torque transmitting link having a secondary front master cylinder thereon.

FIG. 6 is a side sectional view of the torque transmitting link 55 having the secondary front master cylinder 70 thereon. The secondary front master cylinder 70 includes: a cylinder body 71 integral with the torque transmitting link 55; a piston 72 fitted in the cylinder body 71 and axially movable therein; a hydraulic pressure chamber 73 formed in the cylinder body 71 and confronting one end of the piston 72; a hydraulic pressure outlet 73*a* discharging the hydraulic pressure from the hydraulic pressure chamber 73; a return spring 74 fixed to the hydraulic pressure chamber 73 and resiliently pushing the piston 72; and a push rod 75 attached to the piston 72. The push rod 75 constitutes a part of the torque transmitting link 55, is coupled to the second bracket 54 via the coupling pin 57, and is swingable up and down.

In FIG. 6, reference numeral 76 denotes O-rings, reference numeral 77 denotes a stop ring for preventing dislocation of the piston 72, reference numeral 78 denotes a rubber boot, and reference numeral 79 denotes a boot attaching part. The boot attaching part 79 may be integral with the cylinder body 71.

The braking reaction force of the front wheel 32 acts on the push rod 75 as the compressive force (axial force) from the second brackets 54. The compressive force is applied to the front fork 13 via the torque transmitting links 55, thereby stopping the rotation of the brackets 52 and the calipers 56, as shown in FIG. 2.

Further, the foregoing compressive force enables the push rod 75 to move against the resilient force of the return spring 74, and to compress the brake fluid in the hydraulic pressure chamber 73. As a result, braking hydraulic pressure is generated in accordance with the braking reaction force in the chamber 73, and is discharged via the hydraulic pressure outlet 73*a*.

Figure 7:
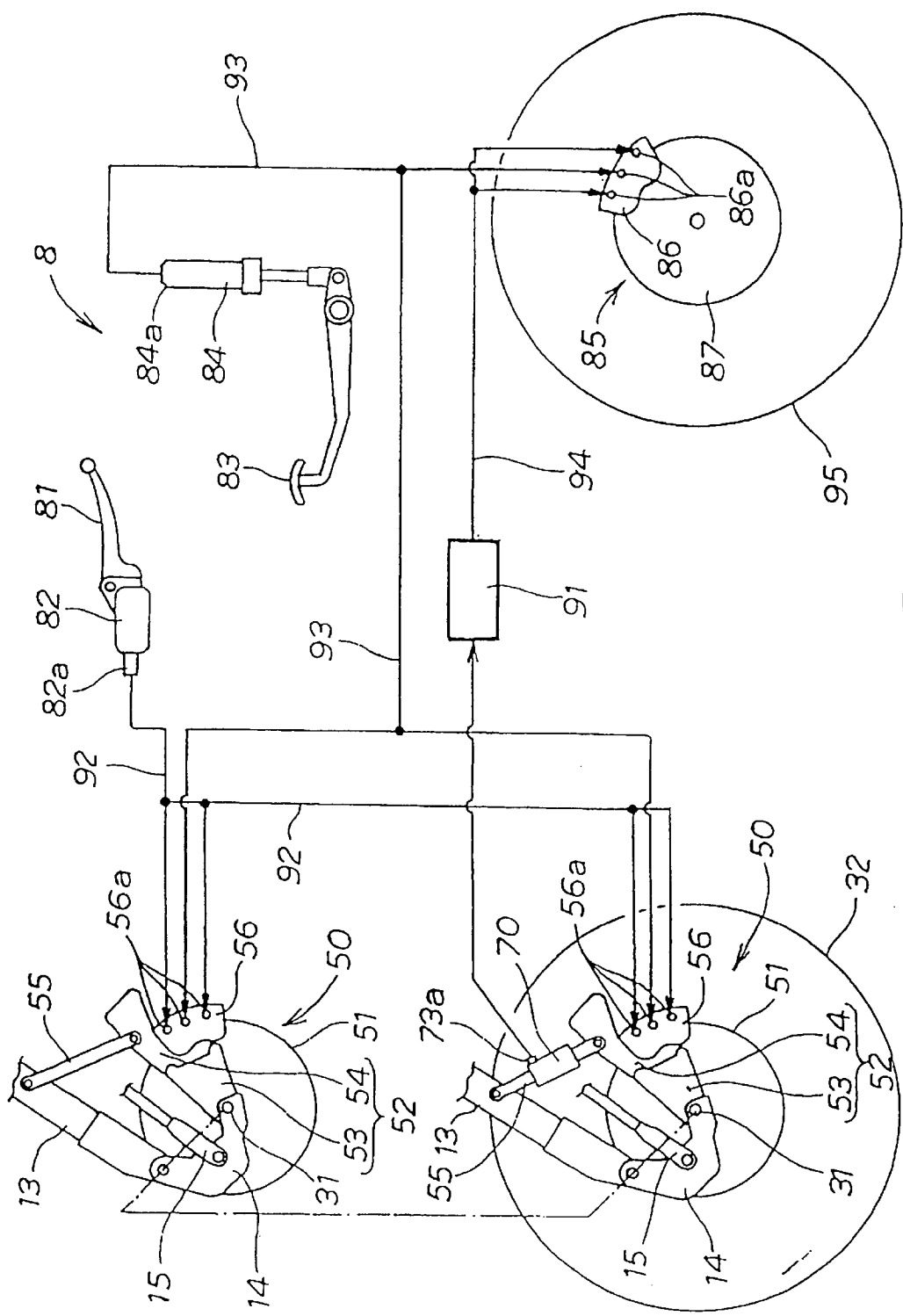
FIG. 7 is a system diagram of a brake system according to the present invention.

FIG. 7 is a system diagram of the brake system of the motorcycle. The brake system 8 includes: a primary front master cylinder 82 for generating the braking hydraulic pressure in response to the operation of the brake lever 81; right and left hydraulic front disc brakes 50 operated by the braking hydraulic pressure of the primary front master cylinder 82; a rear master cylinder 84 for generating braking hydraulic pressure in response to the operation of a brake pedal 83; the hydraulic rear disc brake 85 operated by the braking hydraulic force from the rear master cylinder 84; the secondary front master cylinder 70 for generating braking hydraulic pressure in response to the braking reaction force of the front wheel 32; and a proportional control valve (PCV) 91 for transmitting the braking hydraulic pressure to the hydraulic rear disc brake 85 in accordance with the braking hydraulic pressure from the secondary front master cylinder 70. All of the foregoing components are connected using hydraulic piping 92, 93 and 94.

The right and left front calipers 56 brake the front disc brakes 51 using three pistons 56*a*, respectively. A rear caliper 86 of the hydraulic rear disc brake 85 brakes the rear brake disc 87 using three pistons 86*a*.

The PCV 91 is a control valve which has input and output characteristics in accordance with an ideal braking force distribution between the front and rear wheels 32 and 95 of the motorcycle.

The hydraulic pressure outlet 82*a* of the primary front master cylinder 82 communicates with the opposite ends of the pistons 56*a* of the right and left front calipers 56 via the hydraulic pressure piping 92.

A hydraulic pressure outlet 84*a* of the rear master cylinder 84 is connected to the center pistons 56*a* of the right and left front calipers 56 via the hydraulic pressure piping 93, and to the center piston 86*a* of the rear caliper 86 via the hydraulic pressure piping 93.

The hydraulic pressure outlet 73*a* of the secondary front master cylinder 70 is connected to the pistons 86*a* at the opposite ends of the rear caliper 86 via the PCV 91, via the hydraulic pressure piping 94.

The operation of the brake system 8 will be described with reference to FIG. 7.

When the brake lever 81 is operated, the braking hydraulic pressure is generated at the primary front master cylinder 82, is transmitted to the front calipers 56, and acts on the pistons 56*a* at the opposite ends of the calipers 56, so that the braking force is produced in order to brake the front wheel 32.

In this state, the braking reaction force is generated at the front wheel 32, and is transmitted to the torque transmitting link 55 from the left caliper 56 via the bracket 52, as the compressive force. The compressive force acts on the secondary front master cylinder 70 provided on the torque transmitting link 55. New braking hydraulic pressure produced at the secondary front master cylinder 70 is controlled by the PCV 91 and acts on the pistons 86*a* at the opposite ends of the rear caliper 86, thereby producing braking force, which is applied to brake the rear wheel 95.

The braking hydraulic pressure generated at the rear master cylinder 84 in response to the operation of the brake pedal 83 is distributed to two destinations. Specifically, on one hand, the braking hydraulic pressure is transmitted to the rear caliper 86, and acts on the center piston 86*a* of the rear caliper 86 in order to generate braking force for braking the rear wheel 95. On the other hand, the braking hydraulic pressure is transmitted to the front calipers 56, and acts on the center pistons 56*a* in order to brake the front wheel 32.

In response to the braking reaction force of the front wheel 32, the braking hydraulic pressure at the secondary front master cylinder 70 acts on the pistons 86*a* at the opposite ends of the caliper 86 via the PCV 91, and generates braking force similarly to when the brake lever 81 is operated. Therefore, when the brake pedal 83 is operated, the braking hydraulic pressure acts on all of the three pistons 86*a* of the rear caliper 86, so that it is possible to produce a large braking force at the hydraulic rear disc brake 85 compared with the braking force generated at the time of operating the brake lever 81.

Figure 8:
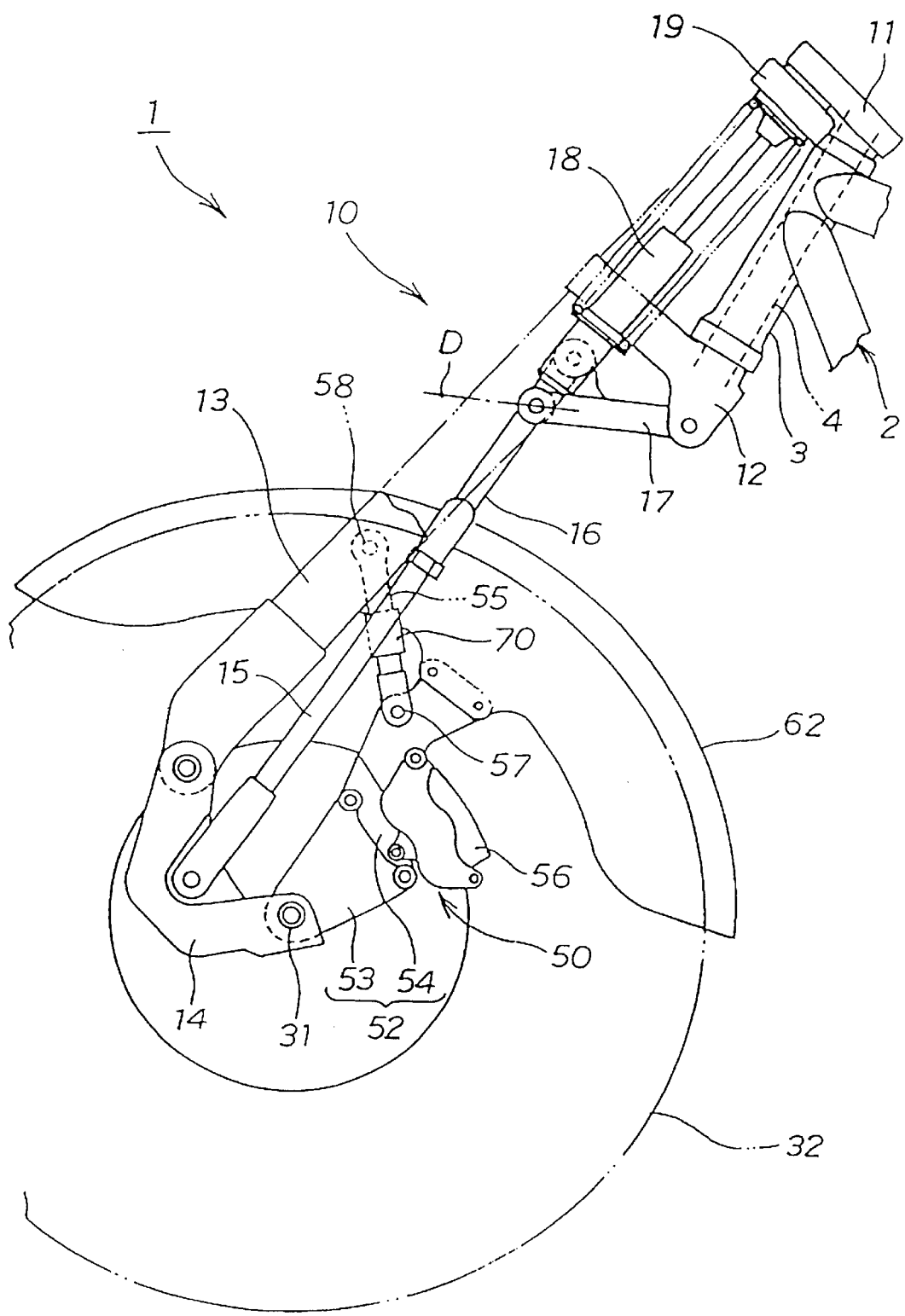
FIG. 8 shows the operation (Part 1) of a front wheel suspension and hydraulic front disc brakes.
Figure 9:
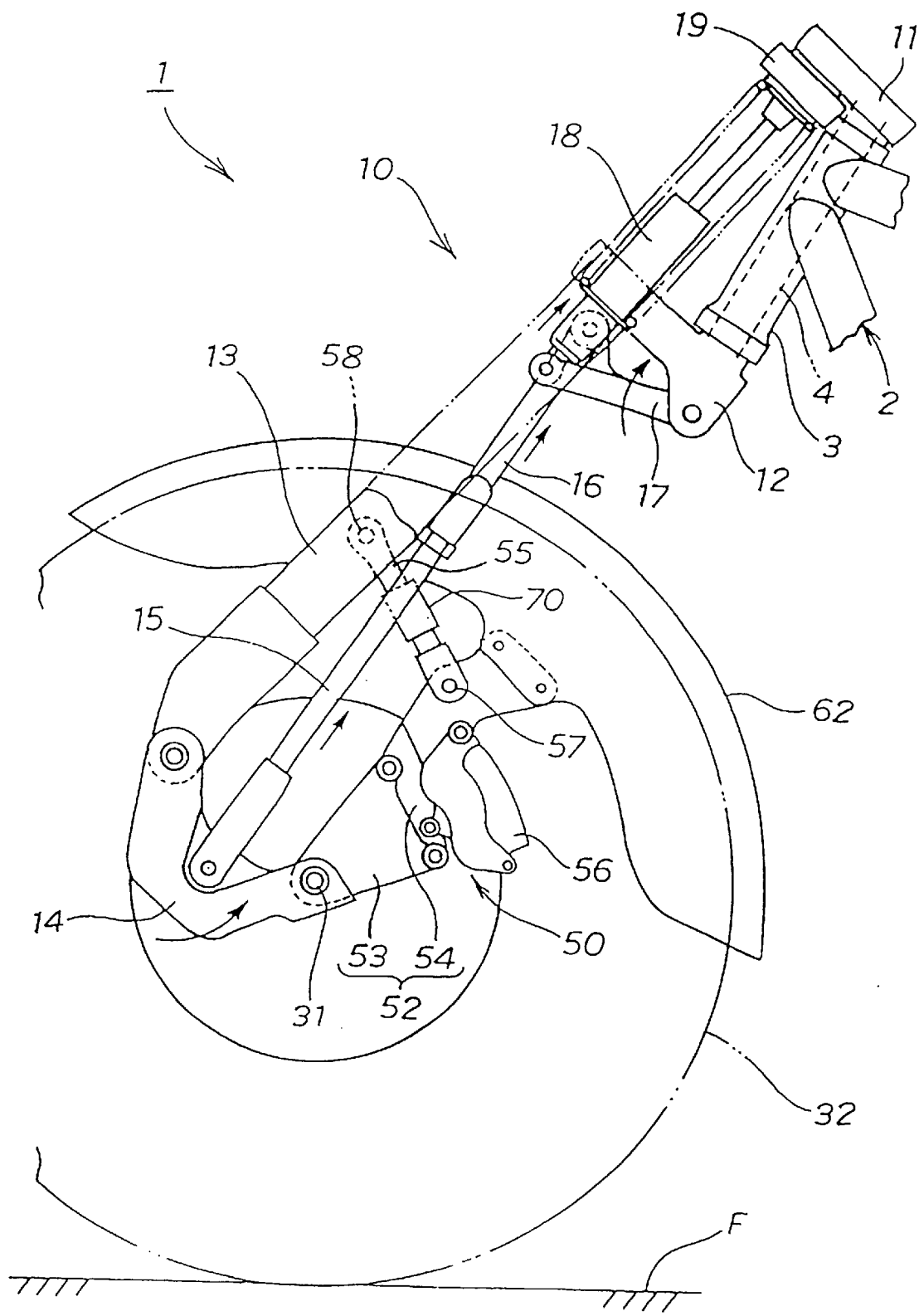
FIG. 9 shows the operation (Part 2) of a front wheel suspension and hydraulic front disc brakes.
Figure 10:
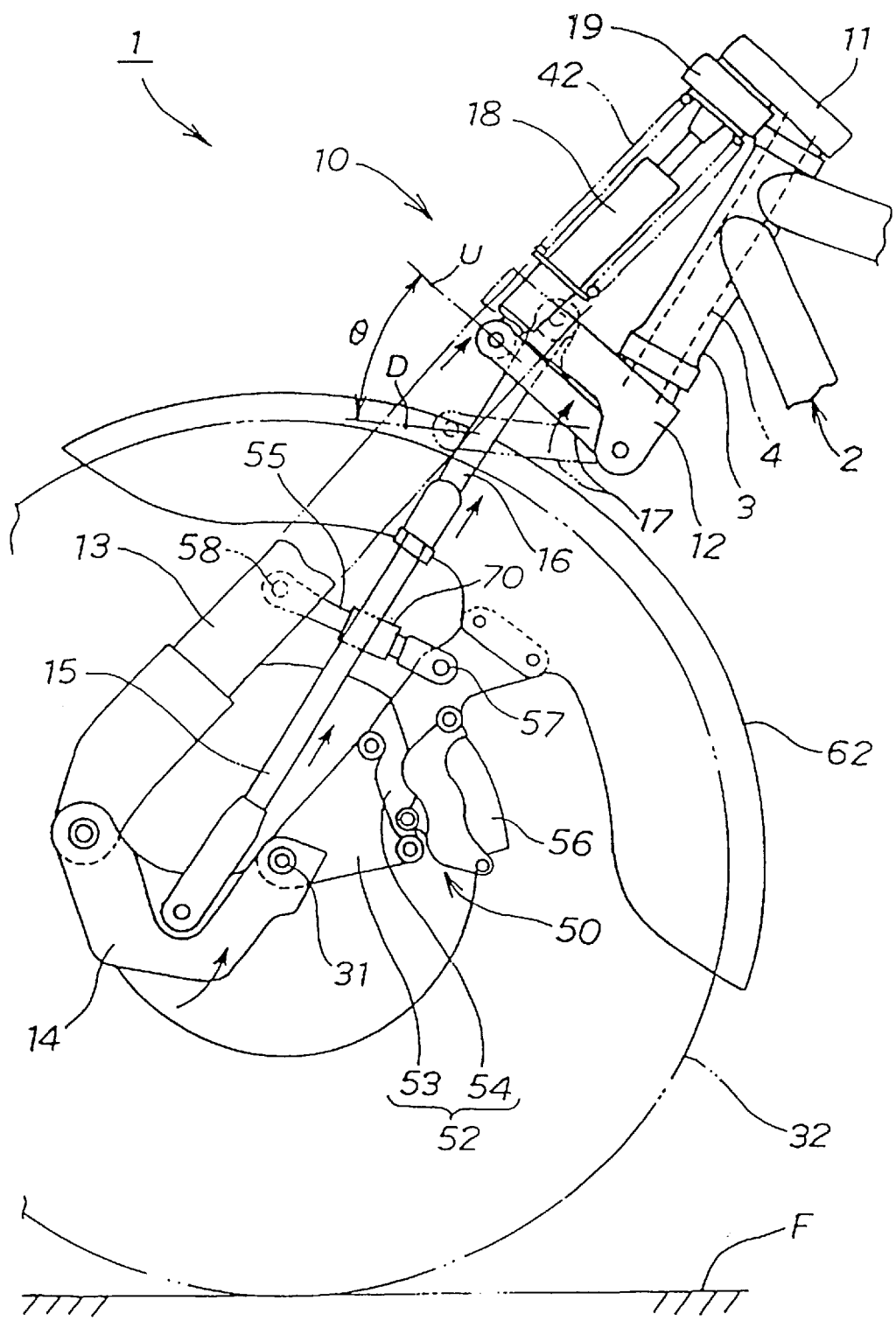
FIG. 10 shows the operation (Part 3) of a front wheel suspension and hydraulic front disc brakes.

The front wheel suspension 10 and the hydraulic front disc brakes 50 operate in the following manner, as shown in FIGS. 8, 9 and 10.

FIG. 8 shows the operation (Part 1) of the front wheel suspension 10 and the hydraulic front disc brakes 50, specifically showing the state of the front wheel suspension 10 when no downward load is applied to the front wheel 32. The front wheel 32 is at its lowest level, and the arm 17 is positioned at the lowest level D. In this state, the spring/damper units 18 remain most extended. Further, the front wheel support arms 14, axle 31, front wheel 32, brackets 52, and the torque transmitting links 55 are positioned at their lowest levels as shown in FIG. 8.

FIG. 9 shows the operation (Part 2) of the front wheel suspension 10 and the hydraulic front disc brakes 50, specifically showing the state of the front wheel suspension 10 when the front wheel 32 is at the middle level, i.e., the spring/damper units 18 are somewhat compressed compared with the state shown in FIG. 7.

When a light load substantially equal to a weight of the motorcycle 1 is applied to the body frame 2, the load is transmitted to a road surface F via the head pipe 3, steering stem 4, top and bottom bridges 11 and 12, front fork 13, front wheel support arms 14, axle 31 and front wheel 32. Reaction force from the road surface F is transmitted to the spring/damper units 18 via the front wheel 32, axle 31, rods 15, rod hanger 16 and arm 17.

Therefore, the front wheel support arms 14 swing slightly upward from the level shown in FIG. 7, and the rods 15 and rod hanger 16 move upward. The front end of the arm 17 swings upward, thereby compressing the spring/damper units 18 by a stroke in accordance with the light load. In this state, the front wheel support arms 14, axle 31, front wheel 32, brackets 52 and torque transmitting links 55 are positioned at their middle levels.

FIG. 10 shows the operation (Part 3) of the front wheel suspension 10 and the hydraulic front disc brakes 50, specifically showing the state of the front wheel suspension 10 when the front wheel 32 is at the highest level, i.e., when the spring/damper units 18 are most compressed.

A heavy downward load applied to the body frame 2 is transmitted to the road surface F via the same path as that shown in FIG. 8. In response to this load, the reaction force from the road surface F is transmitted to the spring/damper units 18 via the front wheel 32. As a result, the rear parts of the front wheel support arms 14 swing further upward, followed by the upward movement of the rods 15 and rod hanger 16. The front end of the arm 17 swings to the uppermost level U, so that the spring/damper units 18 are compressed by a stroke according to the heavy load. In this state, the front wheel support arms 14, axle 31, front wheel 32, brackets 52 and torque transmitting links 55 are positioned at the uppermost levels shown in FIG. 10.

As can be seen from the foregoing description, the arm 17 swings by an angle θ between the lowermost level D shown by an imaginary line and the uppermost level U shown by a solid line, as shown in FIG. 10. As the arm 17 swings, the spring/damper units 18 swing forward and backward with respect to the upper bracket 19.

In the foregoing state, the torque transmitting links 55 simply swing up and down in the ranges shown in FIGS. 8 to 10. Therefore, the brackets 52 do not produce any compressive force (axial force) in response to which braking hydraulic pressure is caused to be produced at the secondary front master cylinder 70.

In the foregoing embodiment:

(1) So long as the front wheel suspension 10 is of the bottom link type, it may have either the trailing or leading arm type configuration. If the leading arm type configuration is adopted, the front wheel support arms 14 are attached to the lower end of the front fork 3 with their front and rear sides in a reversed state;

(2) The front wheel suspension 10 may be or may not be symmetrical with respect to the center CL of the motorcycle body;

(3) The kind and size of the spring/damper units 18 may be determined as desired. The number of the spring/damper units is not always two, but may be one. In such a case, the spring/damper unit should be positioned at the center of the motorcycle body. Further, the outer diameter of the suspension springs 42 of the spring/damper units 18 may be or may not be equal to the diameter of the front fork 13;

(4) The rod hanger 16 is not always required to be substantially in the shape of an inverted Y so long as it can receive the rods 15 and swing up and down with respect to the arm 17. The rods 15 may be coupled to the rod hanger 16 in any manner, e.g. they may be welded or crimped to the rod hanger in addition to screwing. Alternatively, the rods 15 may be integral with the rod hanger 16;

(5) The rods 15 may be directly coupled to the arm 17 without using the rod hanger 16;

(6) Only one hydraulic front disc brake 50 may be attached on the right or left side of the front wheel 32. In such a case, only one each of the bracket 52, torque transmitting link 55 and primary front master cylinder 70 may be provided on the side where the front caliper 56 is provided;

(7) In each bracket 52, the first and second bracket 53 and 54 may be formed as an integral part; and (8) The secondary front master cylinder 70 may be configured as desired so long as it is provided on the torque transmitting link 55.

In the present invention, the brackets are attached to the front wheel axis and are orthogonal therewith, the calipers of the hydraulic front disc brakes are attached to the brackets, the tips of the brackets are coupled to the front fork via the torque transmitting links, and the master cylinder is provided on one of the torque transmitting links in order to produce braking hydraulic pressure in response to the braking reaction force of the front wheel. Therefore, when the braking reaction force of the front wheel acts on the torque transmitting links as the compressive force (axial force) from the calipers, the master cylinder is operated to produce braking hydraulic pressure, which brakes the rear wheel.

The braking reaction force acting on the caliper is received by the front fork via the torque transmitting links, thereby stopping the rotation of the calipers. Further, since the master cylinder is provided on the torque transmitting link and is operated by the braking reaction force transmitted to the front fork from the calipers, the brake system for the motorcycle having a bottom link type front wheel suspension may have a simple structure.

No special mechanism is required in order to transmit the braking reaction force to the master cylinder from the calipers, so that it is not necessary to extensively modify the mechanism of the bottom link type front wheel suspension.

The master cylinder provided on the torque transmitting link can be operated appropriately and smoothly by the compressive force transmitted to the torque transmitting link.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake system for a motorcycle having a suspension for a front wheel, the front wheel having a front brake disc, the system comprising:
   a first bracket swingably mountable to an axle of the front wheel;
   a second bracket swingably mounted to the first bracket, the second bracket being positioned behind a front fork;
   a caliper mounted to the second bracket, the caliper being for operating the front brake disc;
   a torque transmitting unit operably connected to the second bracket, the torque transmitting unit generating hydraulic pressure in response to a braking reaction force applied to the bracket;
   a mudguard connected to the second bracket, the mudguard being movable with the axle of the front wheel; and
   a rear brake, the rear brake being responsive to the hydraulic pressure generated by the torque transmitting unit.

2. The brake system of claim 1, wherein one end of the torque transmitting unit is connectable to a front fork of the motorcycle, the torque transmitting unit being compressible between the bracket and the front fork.

3. The brake system of claim 1, wherein the torque transmitting unit is operably connected to the second bracket by a pin, the pin swingably connecting the torque transmitting unit to the second bracket.

4. The brake system of claim 1, wherein the torque transmitting unit includes:
   a master cylinder, the master cylinder being swingably connected at one end to the second bracket, and swingably connectable at another end to the front fork of the front wheel suspension.

5. The brake system of claim 5, further comprising:
   hydraulic piping connecting an outlet of the master cylinder to the rear brake; and
   a proportional control valve arranged in series with the hydraulic piping.

6. The brake system of claim 1, further comprising:
   a brake lever which is mountable on a handle bar of the motorcycle;
   a primary front master cylinder; and
   hydraulic piping connecting the primary front master cylinder to the caliper; wherein
   the primary master cylinder is responsive to actuation of the brake lever to actuate the caliper via the hydraulic piping.

7. The brake system of claim 1, further comprising:
   a rear master cylinder; and
   hydraulic piping connecting the rear master cylinder to the rear brake; wherein
   the rear brake is responsive to hydraulic pressure generated in the rear master cylinder to actuate the rear brake.

8. The brake system of claim 7, further comprising: hydraulic piping connecting an outlet of the torque transmitting unit to the rear brake.

9. The brake system of claim 4, further comprising:
   a brake actuator mountable to a handle bar of the motorcycle; wherein
   when the brake actuator is actuated, the caliper engages the front brake disc, creating said braking reaction force against the caliper, which is transmitted via the second bracket to the torque transmitting unit.

10. A brake system for a motorcycle comprising:
    a front brake for exerting a braking force on a front wheel of the motorcycle;
    a front brake actuator for actuating the front brake;
    a bracket which is mountable to an axle of the front wheel, the bracket being positioned behind a front fork;
    a torque transmitting unit, the torque transmitting unit being operatively connected to the front brake, and responsive to a braking reaction force exerted by the front wheel on the front brake;
    a mudguard, the mudguard being operatively connected to the bracket; and
    a rear brake for exerting a braking force on a rear wheel of the motorcycle, the rear brake being responsive to the torque transmitting unit to exert the braking force on the rear wheel.

11. The brake system of claim 10, wherein the torque transmitting unit includes:
    a cylinder body;
    a hydraulic pressure chamber; and
    a piston translatable within the cylinder body.

12. The brake system of claim 10, further comprising:
    a second bracket mountable to an axle of the front wheel, one end of the torque transmitting unit being swingably connected to the second bracket.

13. The brake system of claim 12, wherein the front brake includes a caliper, the caliper being mounted to said second bracket such that when the front wheel exerts a braking reaction force on the caliper, the caliper transmits said braking reaction force to the torque transmitting unit via the second bracket.

14. The brake system of claim 12, wherein the torque transmitting unit being operably connected at one end to the front fork.

15. The brake system of claim 10, further comprising:
    a front primary master cylinder, the front brake actuator being responsive to the front primary master cylinder to generate hydraulic pressure to actuate the front brake.

16. A motorcycle comprising:
    a body frame;
    a front wheel;
    a rear wheel;
    a bottom link front wheel suspension including:
       a front fork;
       front wheel support arms connected to distal ends of the front fork, the front wheel support arms being engaged with an axle of the front wheel;
       a rod, the rod having a lower end and an upper end, whereby the lower end being swingable coupled to the front wheel support arms;
       an arm being longitudinally swingable, the arm extending forward from a bottom bridge in order to connect the upper end of the rod; and
       spring/damper units coupled to the arm; and
    a brake system including:
       a bracket engaged with the axle of the front wheel, the bracket being positioned behind the front fork;
       a caliper for exerting a braking force on the front wheel, the caliper being supported on the bracket;
       a mudguard connected to the bracket; and
       a torque transmitting unit, the torque transmitting unit being operably connected at one end to the bracket, and at another end to the front fork.

17. The motorcycle of claim 16, wherein the torque transmitting unit includes a hydraulic cylinder, the hydraulic cylinder generating pressurized hydraulic fluid in response to a braking reaction force exerted by the front wheel on the caliper.

18. The motorcycle of claim 17, wherein the brake system further includes a rear brake; and a hydraulic connection between the torque transmitting unit and the rear brake; wherein the pressurized hydraulic fluid serves to actuate the rear brake via the hydraulic connection.

19. The brake system of claim 1, further comprising:

a rod, the rod having a lower end and an upper end, whereby the lower end being swingable coupled to the front wheel support arms;

an arm being longitudinally swingable, the arm extending forward from a bottom bridge in order to connect the upper end of the rod; and spring/damper units coupled to the arm.

20. The brake system of claim 10, further comprising:

a rod, the rod having a lower end and an upper end, whereby the lower end being swingable coupled to the front wheel support arms;

an arm being longitudinally swingable, the arm extending forward from a bottom bridge in order to connect the upper end of the rod; and spring/damper units coupled to the arm.

* * * * *